US008732296B1

(12) United States Patent
Thomas et al.

(10) Patent No.: US 8,732,296 B1
(45) Date of Patent: May 20, 2014

(54) SYSTEM, METHOD, AND COMPUTER PROGRAM PRODUCT FOR REDIRECTING IRC TRAFFIC IDENTIFIED UTILIZING A PORT-INDEPENDENT ALGORITHM AND CONTROLLING IRC BASED MALWARE

(75) Inventors: Vinoo Thomas, Chennai (IN); Nitin Jyoti, Bangalore (IN); Cedric Cochin, Portland, OR (US); Rachit Mathur, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 329 days.

(21) Appl. No.: 12/436,723

(22) Filed: May 6, 2009

(51) Int. Cl.
*G06F 15/16* (2006.01)
*H04L 29/06* (2006.01)

(52) U.S. Cl.
USPC ........... 709/224; 709/201; 709/202; 709/203; 709/204; 709/205; 709/206; 709/207; 709/213; 709/223; 709/225; 709/227; 709/228; 709/229; 709/230; 709/231; 709/232; 709/233; 709/234; 709/235; 709/236; 709/237; 709/238; 709/239; 726/22; 726/23; 726/24; 726/25; 726/26; 726/27; 726/28; 726/29; 726/30; 726/34; 370/230; 370/235; 370/241; 370/242; 370/252; 370/389; 370/392; 370/400; 370/401; 713/182; 713/187; 713/188; 713/189; 714/E11.001; 714/E11.002; 714/E11.007; 714/E11.017; 714/E11.018; 714/E11.019; 714/E11.021; 714/E11.144; 714/E11.145; 714/E11.178; 714/E11.179

(58) Field of Classification Search
CPC ......... G06F 21/55; G06F 21/56; G06F 21/60; G06F 21/64; H04L 63/1425; H04L 2463/141; H04L 63/1441; H04L 63/1483; H04L 63/20; H04L 63/1416; H04L 47/10; H04L 29/06

USPC ......... 709/206, 225, 232, 201, 202, 203, 204, 709/205, 207, 230, 231, 233, 234, 235, 236, 709/237, 238, 239, 240, 241, 242, 243, 244, 709/213, 223, 224, 227, 228, 229; 726/22–30, 34; 370/241–242, 252, 370/389, 392, 401, 400, 230, 235; 713/182, 713/187, 188, 189; 714/E11.001, E11.002, 714/E11.007, E11.017, E11.018, E11.019, 714/E11.021, E11.144, E11.145, E11.178, 714/E11.179
See application file for complete search history.

(56) References Cited

U.S. PATENT DOCUMENTS

| | | | | |
|---|---|---|---|---|
| 5,491,695 A | * | 2/1996 | Meagher et al. | 370/260 |
| 5,666,411 A | * | 9/1997 | McCarty | 705/51 |
| 6,389,007 B1 | * | 5/2002 | Shenkman et al. | 370/352 |
| 6,446,112 B1 | * | 9/2002 | Bunney et al. | 709/204 |
| 6,606,644 B1 | * | 8/2003 | Ford et al. | 709/203 |

(Continued)

OTHER PUBLICATIONS

Thomas et al., "Feature 1: Defeating IRC Bots on the Internal Network," McAfee Avert Labs, India, Virus Bulletin, Feb. 2007, http://www.mcafee.com/us/local_content/white_papers/threat_center/wp_vb_defeating_irc_bots.pdf.

(Continued)

*Primary Examiner* — Saket K Daftuar
(74) *Attorney, Agent, or Firm* — Wong, Cabello, Lutsch, Rutherford & Brucculeri, LLP (57) ABSTRACT

A system, method, and computer program product are provided for redirecting internet relay chat (IRC) traffic identified utilizing a port-independent algorithm and controlling IRC based malware. In use, IRC traffic communicated via a network is identified utilizing a port-independent algorithm. Furthermore, the IRC traffic is redirected to a honeypot.

21 Claims, 6 Drawing Sheets

(56) References Cited

U.S. PATENT DOCUMENTS

| | | | |
|---|---|---|---|
| 6,678,720 B1* | 1/2004 | Matsumoto et al. | 709/204 |
| 6,822,957 B1* | 11/2004 | Schuster et al. | 370/389 |
| 6,862,625 B1* | 3/2005 | Busey et al. | 709/227 |
| 6,978,292 B1* | 12/2005 | Murakami et al. | 709/204 |
| 7,007,083 B1* | 2/2006 | Chesley | 709/224 |
| 7,007,302 B1* | 2/2006 | Jagger et al. | 726/25 |
| 7,058,975 B2* | 6/2006 | Edwards et al. | 726/22 |
| 7,080,135 B1* | 7/2006 | Williams | 709/223 |
| 7,089,278 B1* | 8/2006 | Churchill et al. | 709/203 |
| 7,136,932 B1* | 11/2006 | Schneider | 709/245 |
| 7,171,690 B2* | 1/2007 | Kouznetsov et al. | 726/22 |
| 7,181,492 B2* | 2/2007 | Wen et al. | 709/204 |
| 7,181,518 B1* | 2/2007 | Matsumoto et al. | 709/224 |
| 7,185,055 B2* | 2/2007 | Matsumoto et al. | 709/204 |
| 7,260,639 B2* | 8/2007 | Afergan et al. | 709/229 |
| 7,263,526 B1* | 8/2007 | Busey et al. | 1/1 |
| 7,426,540 B1* | 9/2008 | Matsumoto et al. | 709/206 |
| 7,463,590 B2* | 12/2008 | Mualem et al. | 370/241 |
| 7,539,857 B2* | 5/2009 | Bartlett et al. | 713/152 |
| 7,540,031 B2* | 5/2009 | Kouznetsov et al. | 726/25 |
| 7,577,993 B2* | 8/2009 | Roychowdhary et al. | 726/22 |
| 7,600,258 B2* | 10/2009 | Desouza et al. | 726/24 |
| 7,636,752 B2* | 12/2009 | Madsen et al. | 709/204 |
| 7,743,096 B2* | 6/2010 | Bouilloux-Lafont et al. | 709/204 |
| 7,752,263 B2* | 7/2010 | Schumacher | 709/204 |
| 7,757,361 B2* | 7/2010 | Edwards et al. | 26/24 |
| 7,779,079 B2* | 8/2010 | Nichols et al. | 709/206 |
| 7,899,650 B2* | 3/2011 | Yeshwantpur et al. | 702/189 |
| 7,929,528 B2* | 4/2011 | Henry et al. | 370/389 |
| 7,996,886 B1* | 8/2011 | Hughes et al. | 726/6 |
| 8,204,984 B1* | 6/2012 | Aziz et al. | 709/224 |
| 2002/0166063 A1* | 11/2002 | Lachman et al. | 713/200 |
| 2003/0105819 A1* | 6/2003 | Kim et al. | 709/205 |
| 2003/0196103 A1* | 10/2003 | Edwards et al. | 713/200 |
| 2004/0078592 A1* | 4/2004 | Fagone et al. | 713/201 |
| 2004/0199630 A1* | 10/2004 | Sarkissian et al. | 709/224 |
| 2004/0221158 A1* | 11/2004 | Olkin et al. | 713/170 |
| 2004/0250124 A1* | 12/2004 | Chesla et al. | 713/201 |
| 2005/0044159 A1* | 2/2005 | Niemi et al. | 709/207 |
| 2005/0055708 A1* | 3/2005 | Gould et al. | 725/25 |
| 2005/0086309 A1* | 4/2005 | Galli et al. | 709/206 |
| 2005/0108415 A1* | 5/2005 | Turk et al. | 709/232 |
| 2005/0210534 A1* | 9/2005 | Krishnamurthy | 726/23 |
| 2006/0050719 A1* | 3/2006 | Barr et al. | 370/401 |
| 2006/0075055 A1* | 4/2006 | Littlefield | 709/206 |
| 2006/0101515 A1* | 5/2006 | Amoroso et al. | 726/23 |
| 2006/0106866 A1* | 5/2006 | Green et al. | 707/104.1 |
| 2006/0117387 A1* | 6/2006 | Gunsalus et al. | 726/24 |
| 2006/0130142 A1* | 6/2006 | Mester et al. | 726/23 |
| 2006/0153204 A1* | 7/2006 | Wang et al. | 370/400 |
| 2006/0168010 A1* | 7/2006 | Vill et al. | 709/206 |
| 2006/0212572 A1* | 9/2006 | Afek et al. | 709/225 |
| 2007/0011740 A1* | 1/2007 | Davis et al. | 726/22 |
| 2007/0016953 A1* | 1/2007 | Morris et al. | 726/24 |
| 2007/0061802 A1* | 3/2007 | Tan et al. | 717/174 |
| 2007/0094728 A1* | 4/2007 | Julisch et al. | 726/23 |
| 2007/0097976 A1* | 5/2007 | Wood et al. | 370/392 |
| 2007/0107059 A1* | 5/2007 | Chasin et al. | 726/23 |
| 2007/0156900 A1* | 7/2007 | Chien | 709/225 |
| 2007/0192656 A1* | 8/2007 | Goessel et al. | 714/719 |
| 2007/0244974 A1* | 10/2007 | Chasin | 709/206 |
| 2007/0271346 A1* | 11/2007 | Vill | 709/206 |
| 2007/0282963 A1* | 12/2007 | Mo et al. | 709/207 |
| 2008/0028463 A1* | 1/2008 | Dagon et al. | 726/22 |
| 2008/0059588 A1* | 3/2008 | Ratliff et al. | 709/206 |
| 2008/0077995 A1* | 3/2008 | Curnyn | 726/27 |
| 2008/0080518 A1* | 4/2008 | Hoeflin et al. | 370/395.42 |
| 2008/0089238 A1* | 4/2008 | Fahmy | 370/252 |
| 2008/0120380 A1* | 5/2008 | Boyd et al. | 709/206 |
| 2008/0155694 A1* | 6/2008 | Kwon et al. | 726/23 |
| 2008/0163354 A1* | 7/2008 | Ben-Shalom et al. | 726/12 |
| 2008/0222532 A1* | 9/2008 | Mester et al. | 715/738 |
| 2008/0229415 A1* | 9/2008 | Kapoor et al. | 726/22 |
| 2008/0235799 A1* | 9/2008 | Julisch et al. | 726/23 |
| 2008/0276317 A1* | 11/2008 | Chandola et al. | 726/23 |
| 2008/0320085 A1* | 12/2008 | Bouilloux-Lafont et al. | 709/206 |
| 2009/0006532 A1* | 1/2009 | Sinn et al. | 709/203 |
| 2009/0064335 A1* | 3/2009 | Sinn et al. | 726/24 |
| 2009/0119778 A1* | 5/2009 | Bhuyan | 726/25 |
| 2009/0158430 A1* | 6/2009 | Borders | 726/23 |
| 2009/0164449 A1* | 6/2009 | Huang | 707/5 |
| 2009/0172815 A1* | 7/2009 | Gu et al. | 726/23 |
| 2009/0182818 A1* | 7/2009 | Krywaniuk | 709/206 |
| 2009/0187992 A1* | 7/2009 | Poston | 726/24 |
| 2009/0210501 A1* | 8/2009 | Risher et al. | 709/206 |
| 2009/0216842 A1* | 8/2009 | Risher et al. | 709/206 |
| 2009/0254989 A1* | 10/2009 | Achan et al. | 726/22 |
| 2009/0260084 A1* | 10/2009 | Naccache | 726/23 |
| 2009/0265786 A1* | 10/2009 | Xie et al. | 726/24 |
| 2009/0319377 A1* | 12/2009 | Gazetova et al. | 705/14.73 |
| 2009/0326383 A1* | 12/2009 | Barnes et al. | 600/476 |
| 2010/0029312 A1* | 2/2010 | Smith et al. | 455/466 |
| 2010/0085976 A1* | 4/2010 | McCarthy et al. | 370/400 |
| 2010/0154061 A1* | 6/2010 | Ollmann | 726/24 |
| 2010/0162396 A1* | 6/2010 | Liu et al. | 726/23 |
| 2010/0228852 A1* | 9/2010 | Gemelos et al. | 709/224 |

OTHER PUBLICATIONS

Thomas et al., "Bot Countermeasures," McAfee Avert Labs, Bangalore, Journal in Computer Virology, Eicar 2007 Best Academic Papers.

"Zotob (computer worm)," Wikipedia, page last modified Apr. 9, 2009, http://en.wikipedia.org/wiki/Zotob.

"DTI: Information Security Breaches Survey 2006, Technical Report," Pricewaterhouse Coopers, copyright 2006 Department of Trade and Industry, http://www.pwc.com/uk/eng/ins-sol/publ/pwc_dti-fullsurveyresults06.pdf.

"Welcome to TamoSoft," copyright 1998-2008 TamoSoft, http://www.tamosoft.com/.

"About ISOTF," http://isotf.org/.

"Home Page: Welcome to Shadowserver," http://www.shadowserver.org/.

Myers, "AIM for Bot Coordination," Virus Bulletin Conference, Montreal, Canada, Oct. 2006, http://www.mcafee.com/us/local_content/white_papers/threat_center/wp_vb2006_myers.pdf.

"News/Announcements," copyright 2007 UnrealIRCd, http://www.unrealircd.com/.

Bacher et al., "Know your Enemy: Tracking Botnets," The Honeynet Project, Aug. 10, 2008, http://www.honeynet.org/papers/bots/.

Barford et al., "An Inside Look at Botnets," Special Workshop on Malware Detection, Advances in Information Security, Springer Verlag, 2006, http://www.cs.wisc.edu/~pb/botnets_final.pdf.

Baylor et al., "Killing Botnets: A view from the trenches," McAfee, Inc., White Paper, Oct. 2006, http://www.mcafee.com/us/local_content/white_papers/wp_botnet.pdf.

"IRC-Mocbot," description added Oct. 22, 2005, description modified Oct. 24, 2005, copyright 2003-2009 McAfee, Inc., http://vil.nai.com/vil/vontent/v_136637.htm.

"W32/Mytob.gen@MM," description added Mar. 2, 2005, description modified May 18, 2005, copyright 2003-2009 McAfee, Inc., http://vil.nai.com/vil/content/v_132158.htm.

"W32/Zotob.worm," description added Aug. 14, 2005, description modified Aug. 15, 2005, copyright 2003-2009 McAfee, Inc., http://vil.nai.com/vil/content/v_135433.htm.

Lemos, "200 days to fix a broken Windows," CNET News, Feb. 13, 2004, http://news.com.com/2100-1002_3-5158625.html.

Evers, "'Critical' Microsoft fix breaks some Net connections," CNET News, Jun. 20, 2006, http://news.com.com/Critical+Microsoft+fix+breaks+some+Net+connections/2100-1002-6086130.html?part=dht&tag=nl.e703.

Evers, "Microsoft patch can cause IE trouble," CNET News, Aug. 15, 2006, http://news.com.com/Microsoft+patch+can+cause+IE+trouble/2100-1002_3-6106039.html?tag=nefd.top.

"Microsoft Windows Server Update Services," copyright 2009 Microsoft Corporation, http://www.microsoft.com/windowsserversystem/updateservices/default.mspx.

(56) References Cited

OTHER PUBLICATIONS

"Morris worm," Wikipedia, page last modified Apr. 2, 2009, http://en.wikipedia.org/wiki/Morris_worm.
"Microsoft Security Bulletin MS06-040," published Aug. 8, 2006, updated Sep. 12, 2006, Microsoft Corporation, http://www.microsoft.com/technet/security/bulletin/MS06-040.mspx.
"Welcome to CERT," copyright 1995-2009 Carnegie Mellon University, http://www.cert.org.
"Welcome to 'beware ircd'," http://ircd.bircd.org.
Oikarinen, "Internet Relay Chat Protocol," RFC 1459, May 1993, http://www.faqs.org/rfcs/rfc1459.html.
"DMZ (computing)," Wikipedia, page last modified Apr. 28, 2009, http://en.wikipedia.org/wiki/Demilitarized_zone_(computing).
"List of DNS record types," Wikipedia, page last modified Apr. 30, 2009, http://en.wikipedia.org/wiki/A_record#Types_of_DNS_records.
Canavan, "The Evolution of Malicious IRC Bots," White Paper: Symantec Security Response, copyright 2005 Symantec Corporation, VB2005 Conference, http://www.symantec.com/avcenter/reference/the.evolution.of.malicious.irc.bots.pdf.
Ianelli et al., "Botnets as a Vehicle for Online Crime," Dec. 1, 2005, Carnegie Mellon University, www.cert.org/archive/pdf/Botnets.pdf.
Thomas et al., "The underground economy: priceless," Login, vol. 31, No. 6, Dec. 2006, www.usenix.org/publications/login/2006-12/openpdfs/cymru.pdf.

* cited by examiner

```
#101 [2][+nt]:.remove                                    @Avert
                                                         [P00|USA|
* Now talking in #101
<Avert> Me logged in as channel operator
  and waiting for the bot to connect.
* [P00|USA| has joined #101
<Avert> The bot has joined in. I'm gonna
  pass commands via the channel topic.
* Retrieving #101 modes...
* Avert changes topic to '.version'
<[P00|USA|> M: alg bot (o9r4f4w8q3)
* Avert changes topic to '.it'
<[P00|USA|> M: Bot installed on:
  02/23/2007, 08:12 PM.
* Avert changes topic to '.status'
<[P00|USA|> M: Status: Idle. Box Uptime:
  0 days 02:10, Bot Uptime: 0 days
  00:08, Connected for: 0 days 00:05.
* Avert changes topic to '.sysinfo'
<[P00|USA|> SYSI: [CPU]: 2400MHz. [RAM]:
  261,616KB total, 92,976KB free. [OS]:
  Windows 2K (SP4) (5.0 - 2195).
  [Sysdir]: C:\WINNT\system32. [Computer
  Name]: VIN00VM2000. [Current User]:
  SYSTEM. [Date]: 23:Feb:2007. [Time]:
  20:25:18. [Uptime]: 0 days 02:10.
  [Free Space]: 0GB/1GB.
<Avert> Lets attempt to kill the bot.
* Avert changes topic to '.remove'
<[P00|USA|> M: Removing bot...
* <[P00|USA| has quit IRC (Read error:
Connection reset by peer)
```

FIGURE 6

SYSTEM, METHOD, AND COMPUTER PROGRAM PRODUCT FOR REDIRECTING IRC TRAFFIC IDENTIFIED UTILIZING A PORT-INDEPENDENT ALGORITHM AND CONTROLLING IRC BASED MALWARE

FIELD OF THE INVENTION

The present invention relates to internet relay chat (IRC) traffic, and more particularly to IRC based malware.

BACKGROUND

Internet relay chat (IRC) has traditionally been utilized for communicating in real-time. However, IRC has become a medium for malware to execute and proliferate. Techniques have been employed for identifying and redirecting IRC traffic for preventing the execution and proliferation of malware utilizing IRC, but unfortunately, such techniques have exhibited various limitations.

Just by way of example, IRC traffic has conventionally been identified (e.g. for the redirection thereof) based on ports predetermined to be a standard for use in communicating IRC traffic. For example, firewall rules have generally been implemented which block IRC traffic on the predetermined ports. Identifying IRC traffic in the foregoing manner, however, is oftentimes circumvented by malware using a non-standard port. There is thus a need for addressing these and/or other issues associated with the prior art.

SUMMARY

A system, method, and computer program product are provided for redirecting interne relay chat (IRC) traffic identified utilizing a port-independent algorithm and controlling IRC based malware. In use, IRC traffic communicated via a network is identified utilizing a port-independent algorithm. Furthermore, the IRC traffic is redirected to a honeypot.

DETAILED DESCRIPTION

Figure 1:
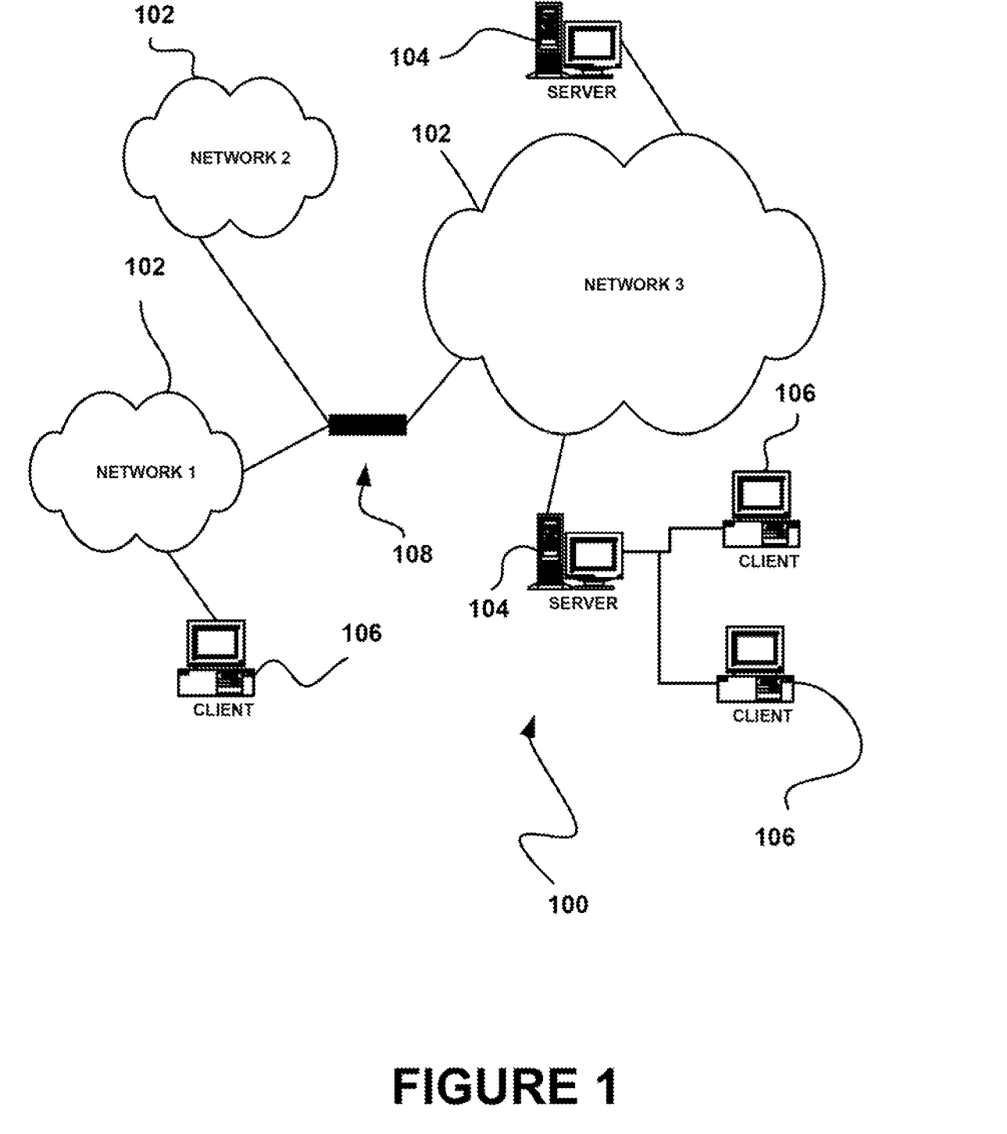
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
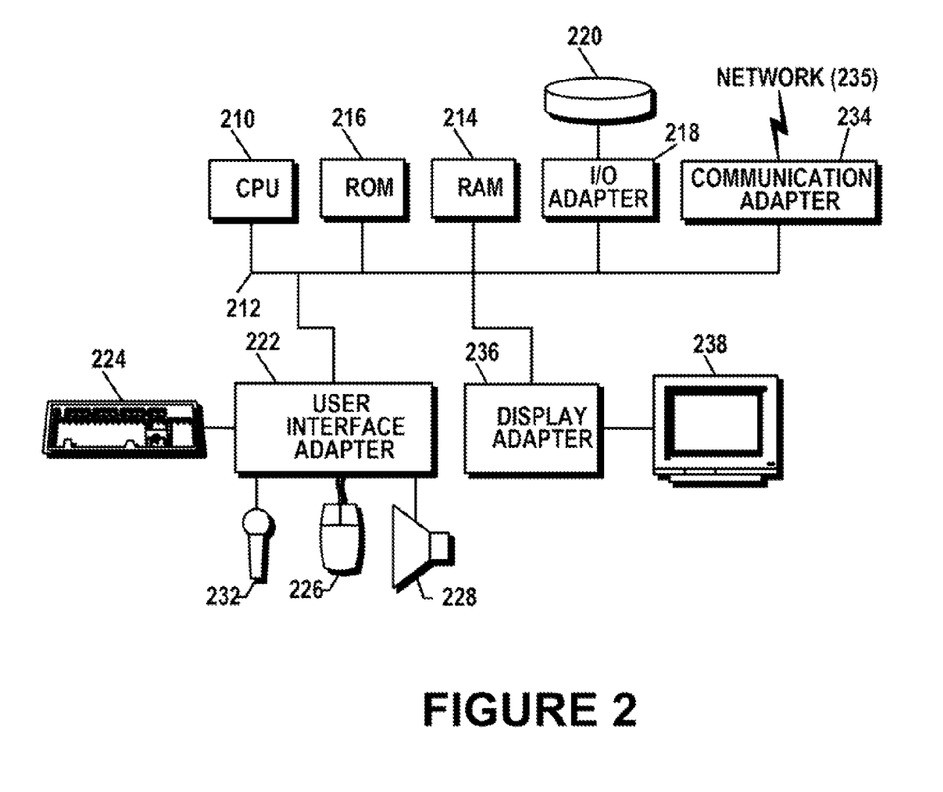
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
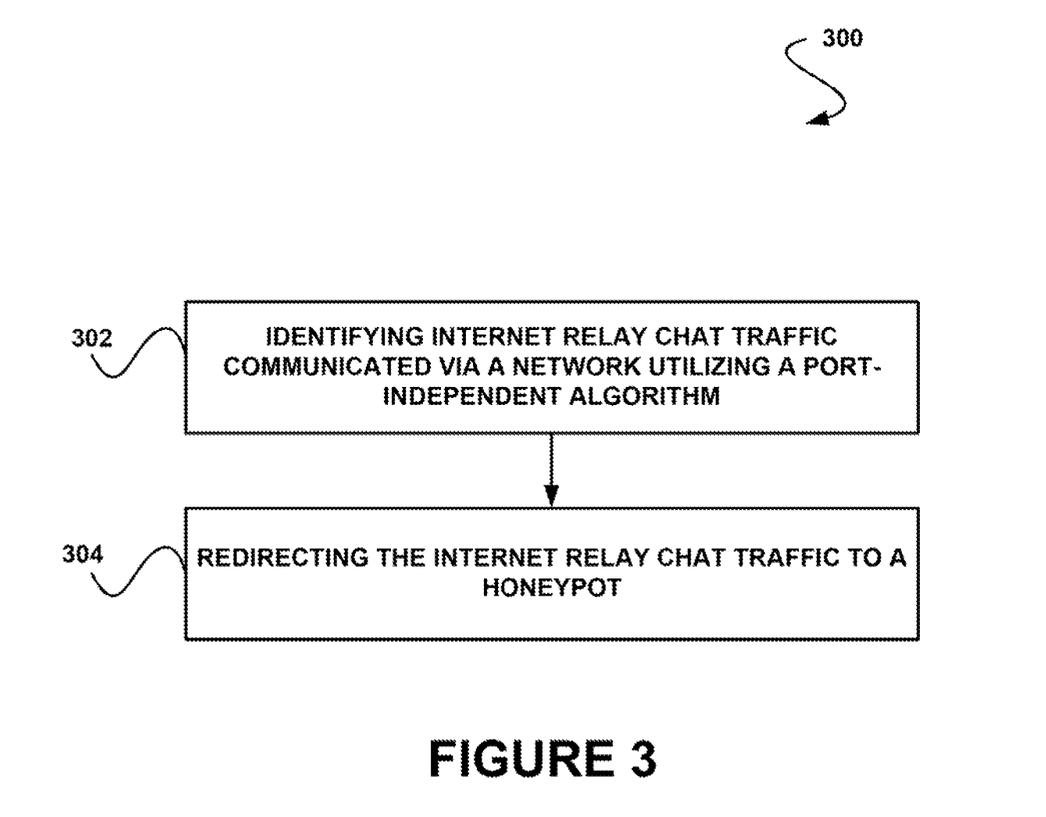
FIG. 3 shows a method for redirecting internet relay chat (IRC) traffic identified utilizing a port-independent algorithm, in accordance with one embodiment.

FIG. 3 shows a method 300 for redirecting internet relay chat (IRC) traffic identified utilizing a port-independent algorithm, in accordance with one embodiment. As an option, the method 300 may be carried out in the context of the architecture and environment of FIGS. 1 and/or 2. Of course, however, the method 300 may be carried out in any desired environment.

As shown in operation 302, IRC traffic communicated via a network is identified utilizing a port-independent algorithm. In the context of the present description, the network may include any type of network via which IRC traffic may be communicated. Just by way of example, the network may include the Internet.

In one embodiment, the IRC traffic may be communicated from one device to another remote device via the network, such as from a client device to a server device, a server device to a client device, etc. Just by way of example, the IRC traffic may be communicated from a command and control server to a device on which a bot (e.g. code for executing an automated task) is located. As another example, the IRC traffic may be communicated from the device on which the bot is located to the command and control server.

To this end, the IRC traffic may include instructions (e.g. sent from the command and control server) for controlling the bot. As another option, the IRC traffic may include a connection from the bot to the command and control server for receiving such instructions. Of course, however, the IRC traffic may include any traffic (e.g. packets, etc.) that is communicated over the network utilizing an IRC protocol (e.g. a communication protocol utilized for IRC). For example, the IRC traffic may be included within a transmission control protocol (TCP) data stream.

Moreover, the port-independent algorithm by which the IRC traffic is identified may include any routine, analysis, etc. which is capable of identifying traffic as IRC traffic regardless of the port associated with such traffic. In one embodiment, traffic communicated over the network may be monitored for identifying the IRC traffic. Further, the port-independent algorithm may be applied to traffic identified based on the monitoring for determining whether the traffic is IRC traffic.

In one embodiment, the port-independent algorithm may identify commands included in the IRC traffic. For example, the port-independent algorithm may scan the IRC traffic for commands included therein (e.g. by searching according to a format predetermined to be indicative of a command, etc.). As another example, the port-independent algorithm may parse the IRC traffic for the commands. In various embodiments, the commands may include verbs, instructions, etc. utilized for commanding a device, application, etc. to perform some action. For example, the commands may include "NICK", "USER", etc.

As an option, the port-independent algorithm may identify commands included in a predetermined temporal location within the IRC traffic. The predetermined temporal location within the IRC traffic may include a predetermined number of packets at a beginning of a sequence of packets of the IRC traffic, in one embodiment. In another embodiment, the predetermined temporal location within the IRC traffic may include a portion of the IRC traffic utilized for establishing a connection, a portion of the IRC traffic associated with an IRC registration sequence, etc. Just by way of example, the port-independent algorithm may identify commands within the first two, three, etc. packets of the IRC traffic.

In another embodiment, the port-independent algorithm may compare the commands to predetermined commands. With respect to the present description, the predetermined commands may include any commands that are predetermined to be indicative of traffic that uses the IRC protocol (e.g. but that are not necessarily unique to the IRC protocol). For example, the predetermined commands may include a replicate command which is capable of being utilized to instruct a bot to replicate.

As an option, comparing the commands to the predetermined commands may include comparing a signature (e.g. byte-level signature, etc.) of each of the commands to signatures (e.g. byte-level signatures, etc.) of the predetermined commands. Thus, the IRC traffic may be identified in response to a determination that the commands match the predetermined commands. Of course, as another option, the port-independent algorithm may compare contents of the CRC traffic (e.g. without first identifying the commands therein) to the predetermined commands for identifying predetermined commands included in the IRC traffic and accordingly identifying the IRC traffic.

As another option, a rule (e.g. expression, etc.) may indicate that only a predefined number of commands in the IRC traffic must match the predetermined commands. In this way, the IRC traffic may be identified in response to a determination that a number of the commands that match the predetermined commands meets the predefined number set forth by the rule. As yet another option, a rule may indicate that only a predefined combination of commands (e.g. NICK" AND "USER", etc.) in the IRC traffic must match the predetermined commands, such that the IRC traffic may be identified in response to a determination that the commands that match the predetermined commands include the predefined combination of commands set forth by the rule.

In yet another embodiment, the port-independent algorithm may compare a sequence (e.g. order, etc.) of the commands included in the IRC traffic to predefined sequences of the predetermined commands. The sequence of commands may include an order of all of the commands identified in the IRC traffic, as an option. As another option, the sequence of commands may include a sub-sequence within such order of all of the commands identified in the IRC traffic.

Further, with respect to the present description, the predefined sequences of the predetermined commands may each include a sequence of predetermined commands predefined to be indicative of traffic that uses the IRC protocol, such as a sequence of predetermined commands predefined to be indicative of an IRC registration. In this way, the IRC traffic may be identified in response to a determination that the sequence of commands included in the IRC traffic match any of the predefined sequences of the predetermined commands. While various examples of the port-independent algorithm have been described above, it should be noted that the IRC traffic may be identified utilizing any desired algorithm capable of identifying traffic as IRC traffic (e.g. capable of identifying traffic as using the IRC protocol) that is port-independent.

Still yet, the port-independent algorithm may enable the IRC traffic to be identified in real-time. In addition, the port-independent algorithm may enable the IRC traffic to be identified across non-standard ports, such as ports that are not necessarily exclusively utilized by IRC traffic. For example, although IRC may generally utilize TCP port 6667, IRC traffic communicated over a different port (based on a non-standard configuration of a device, such as a command and control IRC server, communicating the IRC traffic) may be identified. To this end, the port-independent algorithm may enable the IRC traffic to be identified on-the-fly, without any manual configuration of a firewall via which the IRC traffic is received, and irrespective of a port used to communicate the IRC traffic.

Further, as shown in operation 304, the IRC traffic is redirected to a honeypot. With respect to the present description, the honeypot may include any system or device (e.g. server, etc.) utilized for receiving redirected IRC traffic. For example, the honeypot may include a system that attracts IRC traffic from malicious or unwanted/undesirable sources for the specific purpose of collecting information relating to such IRC traffic (e.g. for analysis purposes), which will be set forth in more detail below. Optionally, the honeypot may be hosted by a security system (e.g. anti-malware, etc.) vendor.

With respect to the present embodiment, redirecting the IRC traffic may include preventing the IRC traffic from being communicated to a destination indicated by the IRC traffic (e.g. a destination to which the IRC traffic was desired to be sent by the source of the IRC traffic) and instead forwarding the IRC traffic to the honeypot. In one embodiment, the IRC traffic may be redirected utilizing a firewall. For example, the firewall may be coupled (e.g. via one or many networks) between the source of the IRC traffic and the honeypot. Redirection via the firewall may optionally result in the IRC traffic being identified, reset, and forwarded to the honeypot.

In another embodiment, the IRC traffic may optionally be redirected transparently. For example, the IRC traffic may be redirected via a relay proxy. In this way, a connection associated with the IRC traffic may not necessarily be dropped. Of course, however, the IRC traffic may be redirected by any system (e.g. which identifies the IRC traffic).

In other embodiments, the IRC traffic may be redirected utilizing internet protocol version 4 (IPv4), internet protocol version 6 (IPv6), and/or any other communication protocol. For example, if the IRC traffic is redirected utilizing IPv6, the firewall may adapt (e.g. via manual configurations, etc.) to changes resulting from the use of IPv6, such as changes to an IP stack, TCP/IP, etc. utilized by the firewall.

As an option, only the identified IRC traffic may be redirected to the honeypot. Thus, only traffic identified as IRC traffic (e.g. only traffic identified as using the IRC protocol), such as via the port-independent algorithm, may be redirected to the honeypot. As another option, information associated with the identified IRC traffic may be utilized to automatically identify other IRC traffic for redirection thereof to the honeypot.

For example, in one embodiment, an internet protocol (IP) address and a port to which the identified IRC traffic is destined may be identified. Optionally, such IP address and port may be identified by extracting a destination IP address identifier and a destination port identifier from the IRC traffic. As another option, the IP address and port may be identified prior to redirecting the identified IRC traffic to the honeypot.

To this end, network traffic (other than the identified IRC traffic) that is destined for the IP address and port may be automatically identified (e.g. without necessarily performing the port-independent analysis) and redirected to the honeypot. Just by way of example, a rule may be created for automatically redirecting network traffic that is destined for the IP address and port to the honeypot. In one embodiment, the firewall may implement such rule for performing the aforementioned redirection.

As another example, a source (e.g. device, etc.) of the identified IRC traffic may be identified. The source may be indicated by an IP address of the source, as an option. As another option, the source may be identified by extracting information indicating the source from the identified IRC traffic. As another option, the source may be identified prior to redirecting the identified IRC traffic to the honeypot.

In this way, network traffic (other than the identified IRC traffic) that is communicated from the source may be automatically identified (e.g. without necessarily performing the port-independent analysis) and redirected to the honeypot. For example, a rule may be created for automatically redirecting network traffic that is from the source to the honeypot. As similarly noted above, the firewall may implement such a rule for performing the aforementioned redirection.

While not shown, it should be noted that the honeypot may utilize the IRC traffic redirected thereto in any desired manner. In one embodiment, the honeypot may utilize the IRC traffic to control malware. For example, the IRC traffic may be associated with malware, and the honeypot may be utilized for preventing future communications of such IRC traffic. One optional embodiment which may be utilized for controlling malware in the aforementioned manner is described in more detail with respect to FIG. 5.

In one exemplary embodiment, the IRC traffic may be associated with a bot. Further, the bot may be associated with malware (e.g. may include malware, may be utilized for proliferating malware, etc.). For example, the IRC traffic may include commands communicated to the bot from a command and control server (e.g. instructing the bot to replicate or perform some other malicious activity). As another example, the IRC traffic may include a connection being established by the bot with the command and control server (e.g. for receiving commands from the command and control server).

Upon communication of the IRC traffic over the network, the IRC traffic may be identified as such (e.g. as utilizing an IRC protocol) utilizing the port-independent algorithm. Furthermore, in response to the identification of the IRC traffic, the IRC traffic may be redirected to the honeypot. The honeypot may thus receive the IRC traffic and take any preconfigured action accordingly.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
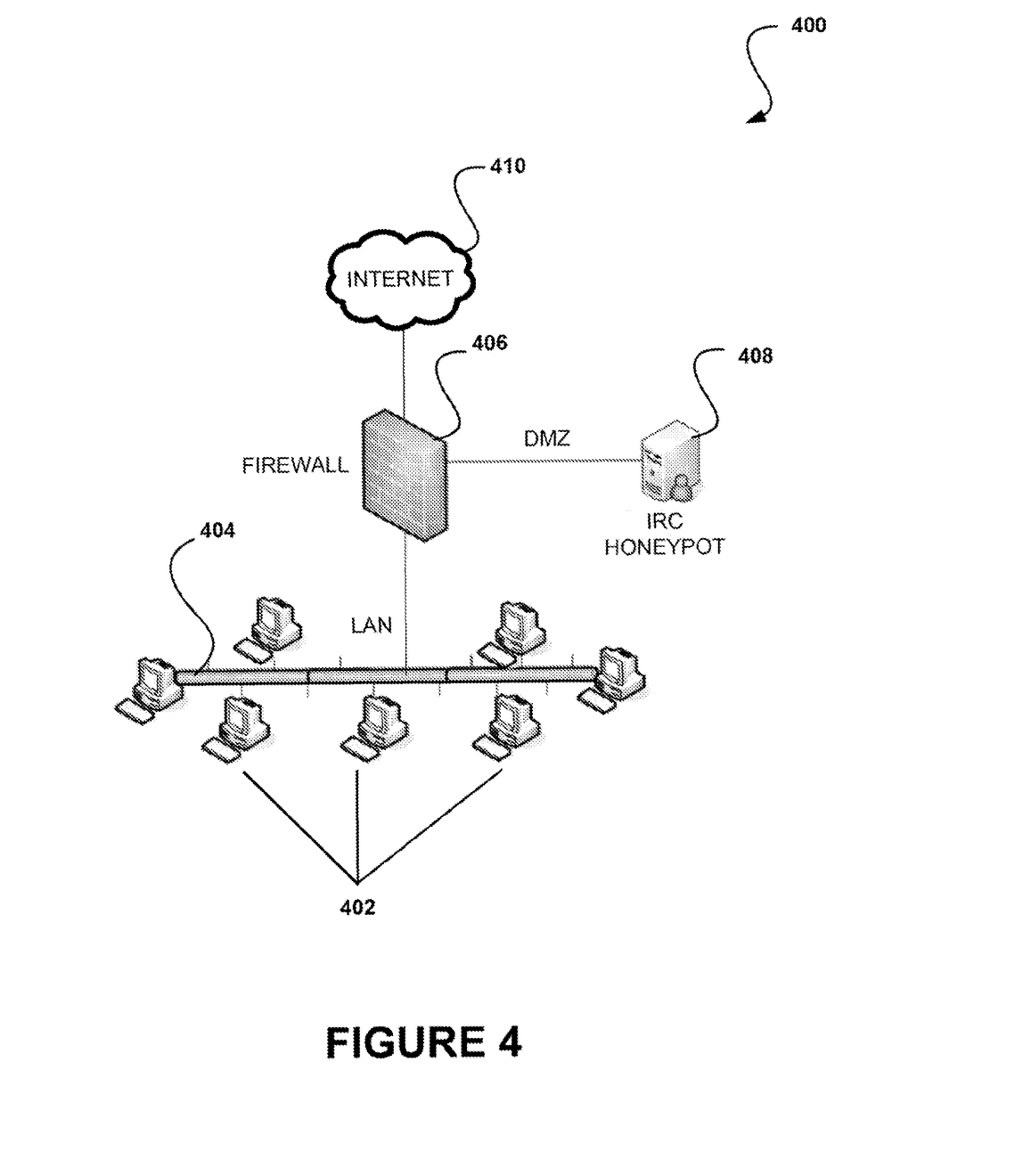
FIG. 4 shows a system for redirecting IRC traffic identified utilizing a port-independent algorithm, in accordance with another embodiment.

FIG. 4 shows a system 400 for redirecting IRC traffic identified utilizing a port-independent algorithm, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, devices 402 are in communication via a network 404. With respect to the present embodiment, the devices 402 may each include any type of device capable of communicating via the network 404. For example, the devices 402 may include any of the devices described above with respect to FIGS. 1 and/or 2.

Additionally, a firewall 406 is coupled to the network 404. Optionally, the firewall 406 may be located within the network 404. For example, the firewall 406 may be located on a perimeter of the network for managing communications across the network 404.

The firewall 406 may be utilized for filtering traffic communicated between the devices 402, in one embodiment. In another embodiment, the firewall 406 may be utilized for filtering traffic communicated from the devices 402 and which is destined to be sent over another network 410 (e.g. the Internet, as shown). In still yet another embodiment, the firewall 406 may be utilized for filtering traffic communicated to the devices 402 from the other network 410.

With respect to the present embodiment, the firewall 406 identifies network traffic received from the devices 404 or from the other network 410 as IRC traffic utilizing a port-independent algorithm. For example, the firewall 406 may apply the port-independent algorithm to the received network traffic for determining whether the received network traffic utilizes an IRC protocol. In this way, the firewall 406 may determined whether the network traffic is IRC traffic.

Upon identification by the firewall 406 of IRC traffic, the firewall 406 forwards the IRC traffic to an IRC honeypot 408. The IRC honeypot 408 may be installed on an IRC server, as an option. As shown, the firewall 406 may communicate with the IRC honeypot 408 via a data management zone (DMZ). The IRC honeypot 408 may therefore be utilized for collecting IRC traffic filtered by the firewall 406 utilizing the port-independent algorithm. It should be noted that while a firewall 406 is shown, any desired gateway may be utilized for identifying the IRC traffic utilizing the port-independent algorithm and redirecting the same to the IRC honeypot 408.

Optionally, the IRC honeypot 408 may utilize the received IRC traffic for controlling malware. For example, the IRC honeypot may communicate information associated with any received IRC traffic with the firewall 406 and/or any other security system for allowing the firewall 406 to analyze the IRC traffic and determine whether such traffic is associated with malware, identify bots associated with the IRC traffic, uninstall such bots (e.g. if determined to be associated with malware), create rules for automatically forwarding other network traffic to the IRC honeypot 408 (without necessarily performing the port-independent algorithm thereto, such as the rules described above with respect to FIG. 3), and/or perform any other action for controlling the malware.

Just by way of example, the IRC traffic may be associated with a bot. Thus, when the bot attempts to resolve and connect with an IRC server (e.g. a command and control server), the bot may be redirected to the IRC honeypot 408. The IRC honeypot 408 may, upon receipt of the IRC traffic, identify the bot and take action with respect to the bot (e.g. for uninstalling the bot, etc.).

Figure 5:
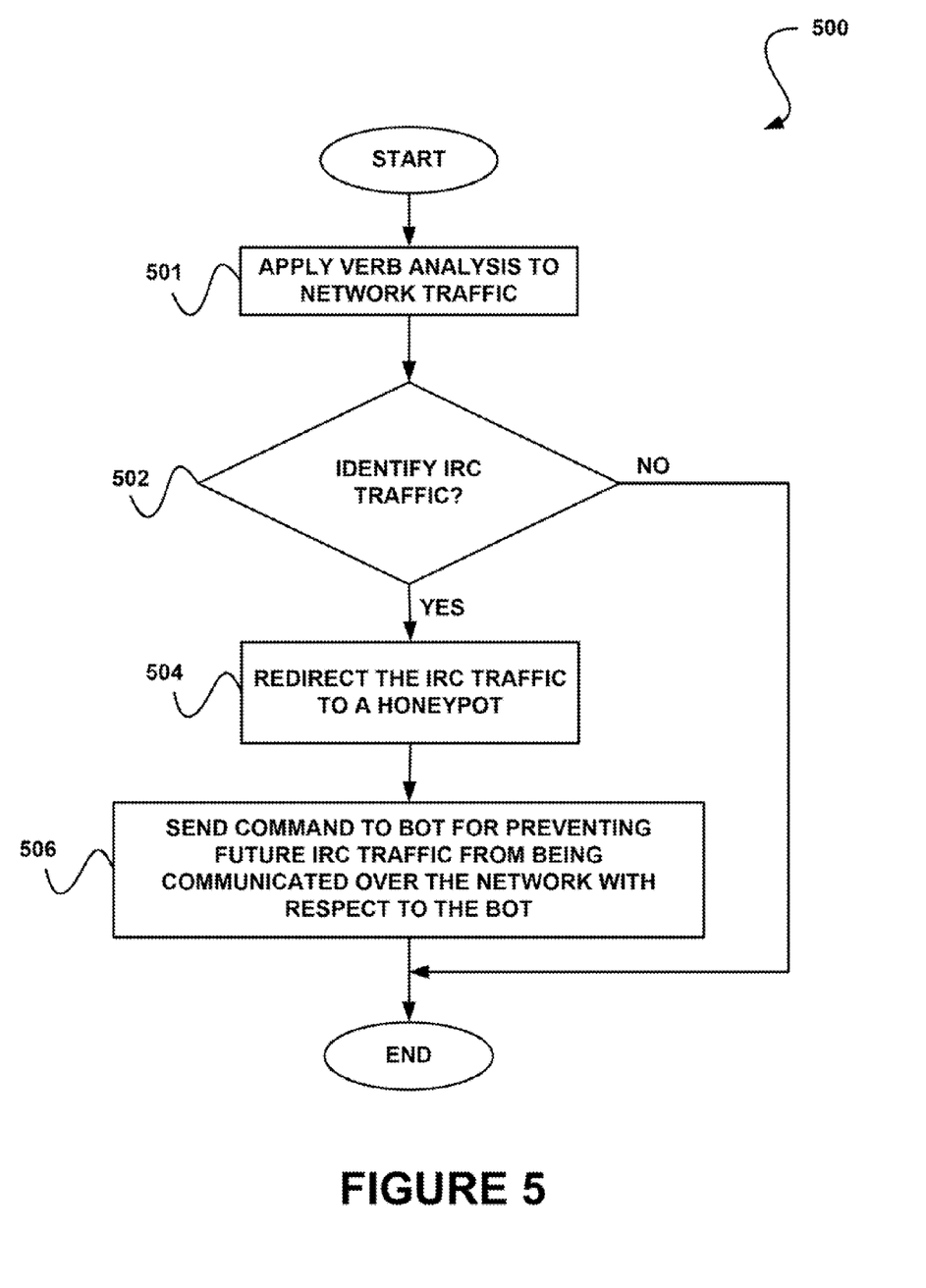
FIG. 5 shows a method for preventing future IRC traffic from being communicated, in accordance with yet another embodiment.

FIG. 5 shows a method 500 for preventing future IRC traffic from being communicated, in accordance with yet another embodiment. As an option, the method 500 may be carried out in the context of the architecture and environment of FIGS. 1-4. For example, the method 500 may be carried out utilizing the firewall 406 of FIG. 4. Of course, however, the method 500 may be carried out in any desired environment. Again, it should be noted that the aforementioned definitions may apply during the present description.

As shown in operation 501, a verb analysis is applied to network traffic. With respect to the present embodiment, the verb analysis may include a port-independent algorithm in which IRC traffic is identified based on verbs, such as commands, included therein. Just by way of example, it may be determined whether a combination of verbs included in the network traffic matches a predefined combination of predetermined verbs (e.g. where the predefined combination is indicative of IRC traffic).

It is further determined whether IRC traffic is identified, as shown in decision 502. Specifically, it may be determined whether IRC traffic is identified based on the verb analysis applied to the network traffic. Thus, in one embodiment, it may be determined that IRC traffic is not identified if the verb analysis results indicate that the network traffic is not IRC traffic (e.g. that the network traffic does not include the predefined combination of predetermined verbs). Likewise, it may be determined that IRC traffic is identified if the verb analysis results indicate that the network traffic is IRC traffic (e.g. that the network traffic includes the predefined combination of predetermined verbs).

If it is determined that that IRC traffic is not identified, the method 500 terminates. If, however, it is determined that IRC traffic is identified, the IRC traffic is redirected to a honeypot. Note operation 504. With respect to the present embodiment, redirecting the IRC traffic may include preventing the IRC traffic from being communicated to a destination indicated by the IRC traffic and instead forwarding the IRC traffic to the honeypot.

Moreover, a command is sent to a bot for preventing future IRC traffic from being communicated over the network with respect to the bot, as shown in operation 506. With respect to the present embodiment, the bot may be the source of the IRC traffic or may optionally be the destination of the IRC traffic prior to the IRC traffic being forwarded to the honeypot. Further, the command may prevent the bot from sending or receiving future IRC traffic. To this end, in an embodiment where the bot is associated with malware, the malware may be prevented from executing and/or proliferating by way of IRC traffic sent from and/or received by the bot.

In one embodiment, the command may include an uninstall command. The uninstall command may be utilized for uninstalling the bot. For example, based on the identified IRC traffic, the bot may be identified. In addition, a category (e.g. family, etc.) of the bot may also be identified. As an option, the category may be identified utilizing a database of bot categories, where each bat category is stored with corresponding verb combinations predetermined to be included in IRC traffic associated with bots of the particular bot category. Thus, the verbs included in the identified IRC traffic may be look-up in the database for identifying the bet category corresponding to a combination of the verbs.

For each bot category, the database may further store uninstall capabilities of bots included in such bot category. For example, the uninstall capabilities may include commands capable of being used on bots in the bot category for uninstalling the bot or otherwise preventing IRC traffic with respect to the bot. Once an uninstall command particular to a bot category of the bot is identified, it may be sent to the bot for preventing future IRC traffic from being communicated over the network with respect to the bot.

In another embodiment, the command may include a stay quiet command. The stay quiet command may optionally prevent the bot from communicating over the network (e.g. from establishing a connection with a command and control server utilized for sending instructions to the bot, etc.). Of course, however, the command may include any desired command utilized for preventing future IRC traffic from being communicated over the network with respect to the bot.

Table 1 shows various examples of commands that may be sent to bots in Agobot, Sdbot, and Spybot categories for preventing future IRC traffic from being communicated over the network with respect to the bots. It should be noted that such commands are set forth for illustrative purposes only, and thus should not be construed as limiting in any manner.

TABLE 1

| Command | Description | Example |
|---|---|---|
| bot.die | terminates the bot | <Agobot> .bot.die<br><-- Agobot has quit<br>(Read error: Connection reset by peer) |
| bot.quit | causes the bot to quit IRC and terminate itself | <Agobot> .bot.quit<br><-- Agobot has quit<br>(Read error: Connection reset by peer) |
| bot.remove | completely removes the bot from the system | <Agobot> .bot.remove<br>removing bot . . .<br><-- Agobot has quit<br>(Read error: Connection reset by peer) |
| die | causes the bot to immediately close on the host's computer. This will also kill all threads, so be careful. Try to use 'quit' if possible instead of die, because die performs no cleanup. | <[sdbot]> .die<br>* sdbot has quit<br>(connection reset by peer) |
| quit | causes the bot to quit the current server (with the specified message, if any). This command will also close the bot and kill all threads, so be careful. | <[sdbot]> .quit<br>* sdbot has quit (goodbye.) |
| remove | causes the bot to totally remove itself from the host computer (including autostart) | <[sdbot]> .remove<br>removing bot . . .<br>* sdbot has quit<br>(Connection reset by peer) |
| quit | bot quits running | <[spybot]> .quit<br>* spybot has quit IRC<br>(Client exited) |
| uninstall | it doesn't delete the server, only removes the startup keys | <[spybot] .uninstall<br>uninstalling . . .<br>* spybot has quit IRC<br>(Client exited) |

In one exemplary embodiment, the command may be sent to the bot once IRC traffic associated with the bot is identified. The command may optionally be sent via a channel topic associated with the IRC traffic. Sending the command via the channel topic may not necessarily require an initial login to the bot, as changing the channel topic may automatically result in a trusted status such that a command may be sent to the bot. In other optional embodiments, the command may be sent via private IRC messages, IRC chat messages, etc.

Figure 6:
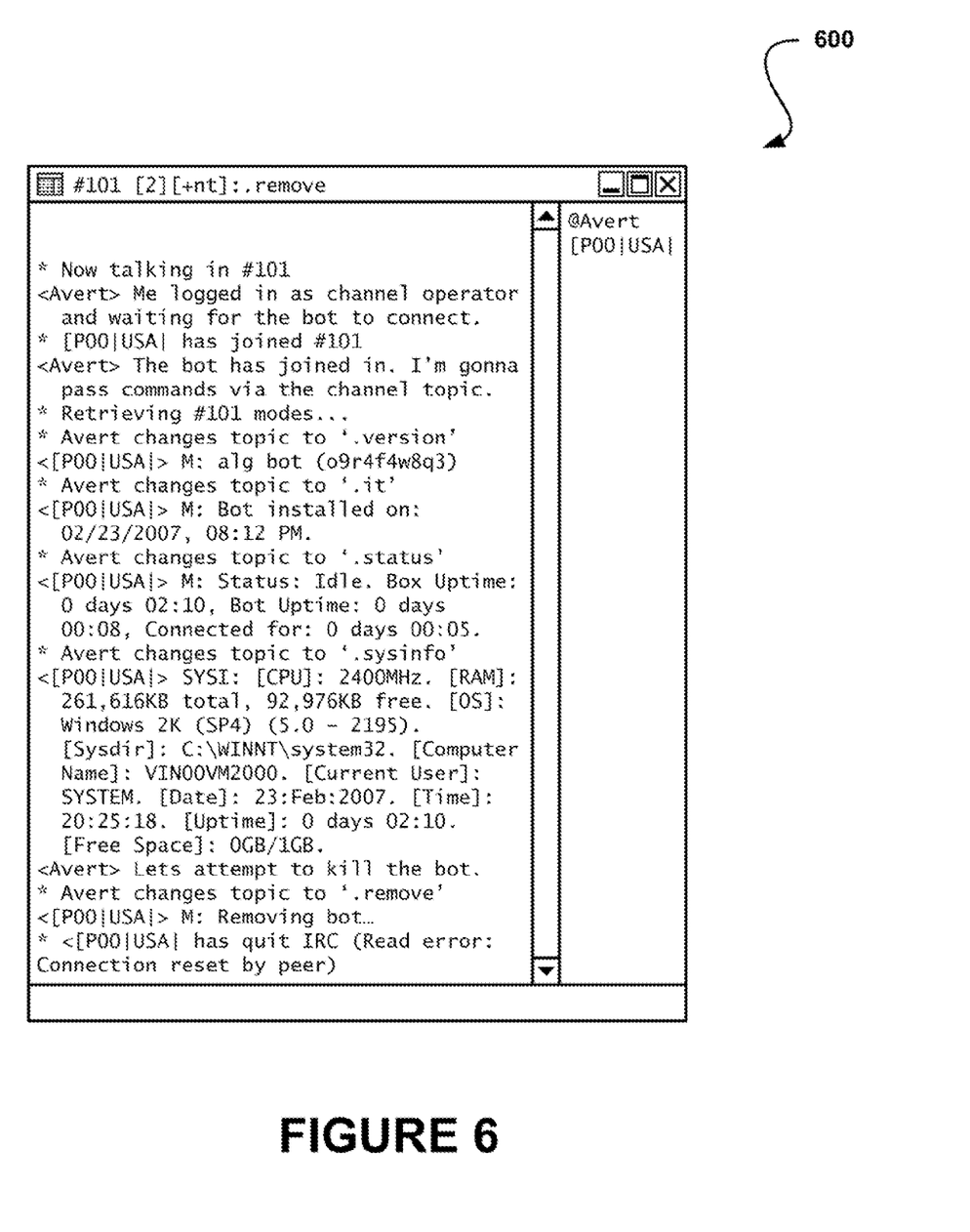
FIG. 6 shows a graphical user interface (GUI) depicting an uninstall command for uninstalling a bot from a device infected with malware, in accordance still yet another embodiment.

FIG. 6 shows a graphical user interface (GUI) 600 depicting an uninstall command for uninstalling a bot from a device infected with malware, in accordance still yet another embodiment. As an option, the GUI 600 may be implemented in the context of the architecture and environment of FIGS. 1-5. For example, the GUI 600 may be implemented utilizing an application of the firewall 406 of FIG. 4. Of course, however, the GUI 600 may be implemented in any desired environment. Yet again, it should be noted that the aforementioned definitions may apply during the present description.

As shown, commands are passed to a bot using an IRC channel topic. However, it should be noted that the system setting the IRC channel topic (e.g. the firewall) may optionally need to log into the IRC channel first, before the bot connects to the IRC channel, such that control of the IRC channel topic may be maintained (thus allowing such IRC channel topic to be set). Every time the bot is kicked out of the IRC channel, the bot may immediately attempt to reconnect to the IRC channel. Upon reconnecting to the IRC channel, the bot may execute the command that is set as the current channel topic.

Table 2 illustrates one example of code which may be utilized to set a command as a topic of an IRC channel such that the command is automatically passed to the bot when the bot joins the IRC channel and such that the bot automatically executes the command upon receiving the command. While the command shown includes a scan command (.advscan), it should be noted that the command may similarly include the uninstall command and/or any other desired command. It should be noted that the code illustrated in Table 2 is set forth for illustrative purposes only, and thus should not be construed as limiting in any manner.

TABLE 2

```
.advscan netapi 200 5 0 -r -s
[SCAN]: Random Scanner started: 192.168.x.x:445 connect timeout
5
seconds 0 with 200 threads
[SCAN]: IP: 192.168.164.XXX:445, Scan thread: 0, Sub-thread: 1.
[SCAN]: IP: 192.168.164.XXX:445, Scan thread: 0, Sub-thread: 1.
[SCAN]: IP: 192.168.122.XXX:445, Scan thread: 0, Sub-thread: 1.
[SCAN]: IP: 192.168.143.XXX:445, Scan thread: 0, Sub-thread: 1.
[SCAN]: IP: 192.168.121.XXX:445, Scan thread: 0, Sub-thread: 1.
```

Thus, in response to setting the channel topic to an uninstall command, the bot may automatically uninstall itself upon connecting to the channel. In this way, every bot that connects to the aforementioned IRC channel may uninstall itself from the device on which it is located.

Of course, as another option (not shown), if no command is set on the IRC channel topic, the bots connecting to such IRC channel may be idle as a result of the connection (e.g. they may also remain idle, awaiting a command). Thus, even if the bot does not contain an uninstall command (e.g. is not capable of executing an uninstall command passed to it), using no command such that the bots remain idle may optionally provide early warning detection of bots associated with malware on an internal network as well as an ability to identify and quarantine devices containing malware virtue of the bots being located on such devices.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method performed by a computing device coupled to a network, the method comprising:

receiving network traffic via a network interface;

differentiating, within the received network traffic, internet relay chat (IRC) traffic by utilizing a programmed processor to apply a port-independent algorithm operable on the payload of the received network traffic, wherein the programmed processor identifies one or more commands included in the IRC traffic, comprising:

identifying commands included in a predetermined temporal location within the IRC traffic, comprising identifying a predetermined number of packets at a beginning of a sequence of packets of the IRC traffic;

redirecting the IRC traffic to a system that attracts IRC traffic for the purpose of collecting information relating to such IRC traffic; and transmitting, based on the collected information, a command to a bot associated with the IRC traffic to prevent future IRC traffic from being communicated over the network with respect to the bot.

2. The method of claim 1, wherein the redirected IRC traffic includes instructions for controlling the bot.

3. The method of claim 1, wherein the act of receiving network traffic comprises receiving network traffic with a firewall.

4. The method of claim 1, further comprising identifying a destination address and a destination port of the IRC traffic, prior to redirecting the IRC traffic to the system that attracts IRC traffic for the purpose of collecting information relating to such IRC traffic.

5. The method of claim 4, further comprising automatically redirecting the network traffic destined for the destination address and the destination port.

6. The method of claim 1, further comprising:

identifying a source of the IRC traffic; and automatically redirecting the network traffic sent from the source to the system that attracts IRC traffic for collecting information relating to such IRC traffic.

7. A device, comprising:

a network interface;

a memory or storage unit; and a processor coupled to the network interface and to the memory or storage unit;

wherein the memory or storage unit is configured to store and the processor is configured to execute instructions to cause the device to:

monitor network traffic received via the network interface;

differentiate, within the received network traffic, internet relay chat (IRC) traffic from other network traffic by utilizing a port-independent algorithm operable on the payload of the received network traffic, by identifying one or more commands included in the IRC traffic, wherein the instructions to cause the device to differentiate by identifying one more commands comprise instructions that when executed cause the device to:

identify commands included in a predetermined temporal location within the IRC traffic, wherein the instructions to identify commands included in a predetermined temporal location within the IRC traffic comprise instructions that when executed cause the device to identify a predetermined number of packets at a beginning of a sequence of packets of the IRC traffic;

redirect the IRC traffic to a system that attracts IRC traffic for the purpose of collecting information relating to such IRC traffic; and transmit, based on the collected information, a command to a bot associated with the IRC traffic to stop future IRC traffic from being communicated over the network with respect to the bot.

8. The device of claim 7, wherein the redirected IRC traffic includes instructions for controlling the bot.

9. The device of claim 7, wherein the device comprises a firewall.

10. The device of claim 7, wherein the instructions to differentiate IRC traffic to identify one or more commands included in the IRC traffic include instructions to compare the one or more commands to predetermined commands.

11. The device of claim 10, wherein the instructions to compare the one or more commands to predetermined commands include instructions to compare the one or more commands to commands predetermined to be indicative of traffic that uses an IRC protocol.

12. The device of claim 10, wherein the instructions to differentiate IRC traffic include instructions to differentiate IRC traffic in response to a determination that the commands included in the IRC traffic match the predetermined commands.

13. The device of claim 10, wherein the instructions to compare the one or more commands to predetermined commands include instructions to compare a signature of one or more of the commands to signatures of one or more predetermined commands.

14. The device of claim 10, wherein the instructions to differentiate IRC traffic from other network traffic by utilizing the port-independent algorithm comprise instructions to compare a sequence of the commands included in the IRC traffic to predefined sequences of predetermined commands.

15. The device of claim 14, wherein the predefined sequences of predetermined commands each include a sequence of the predetermined commands predefined to be indicative of traffic that uses an IRC protocol.

16. The device of claim 14, wherein the instructions to differentiate IRC traffic include instructions to differentiate IRC traffic in response to a determination that the sequence of the commands included in the IRC traffic match one of the predefined sequences of the predetermined commands.

17. The device of claim 7, wherein the instructions to cause the device further include instructions to cause the device to identify a destination address and a destination port of the IRC traffic, prior to redirecting the IRC traffic to the system that attracts IRC traffic for the purpose of collecting information relating to such IRC traffic.

18. The device of claim 17, wherein the instructions to cause the device further include instructions to cause the device to automatically redirect network traffic destined for the destination address and the destination port.

19. The device of claim 7, wherein the instructions to cause the device further include instructions to cause the device to identify a source of the IRC traffic and automatically redirect network traffic sent from the source to the system that attracts IRC traffic for the purpose of collecting information relating to such IRC traffic.

20. A non-transitory computer-readable medium comprising instructions stored thereon to cause one or more processors to:

monitor network traffic received via a network interface;

differentiate, within the received network traffic, internet relay chat (IRC) traffic from other network traffic utilizing a port-independent algorithm operable on the payload of the received network traffic, by identifying one or more commands included in the IRC traffic, the instructions to cause the one or more processors to differentiate by identifying one or more commands included in the IRC traffic comprising instructions that when executed cause the one or more processors to identify commands included in a predetermined temporal location within the IRC traffic, wherein the instructions to identify commands included in a predetermined temporal location within the IRC traffic comprise instructions that when executed cause the device to identify a predetermined number of packets at a beginning of a sequence of packets of the IRC traffic;

redirect the IRC traffic to a system that attracts IRC traffic for the purpose of collecting information relating to such IRC traffic; and transmit, based on the collected information, a command to a bot associated with the IRC traffic to stop future IRC traffic from being communicated over the network with respect to the bot.

21. The non-transitory computer-readable medium of claim 20, further comprising instructions to cause the one or more processors to:

identify a source of the IRC traffic; and automatically redirect the network traffic sent from the source to the system that attracts IRC traffic.

* * * * *